(12) United States Patent
Gupta et al.

(10) Patent No.: US 12,430,275 B2
(45) Date of Patent: Sep. 30, 2025

(54) METHODS TO EXTEND NoC INTERCONNECT ACROSS MULTIPLE DICE IN 3D

(71) Applicant: XILINX, INC., San Jose, CA (US)

(72) Inventors: Aman Gupta, Sunnyvale, CA (US); Krishnan Srinivasan, San Jose, CA (US); Brian C. Gaide, Erie, CO (US); Ahmad R. Ansari, San Jose, CA (US); Sagheer Ahmad, Cupertino, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 18/204,246

(22) Filed: May 31, 2023

(65) Prior Publication Data

US 2024/0403253 A1 Dec. 5, 2024

(51) Int. Cl.
*G06F 13/40* (2006.01)
*G06F 13/42* (2006.01)

(52) U.S. Cl.
CPC ...... *G06F 13/4072* (2013.01); *G06F 13/4022* (2013.01); *G06F 13/4265* (2013.01)

(58) Field of Classification Search
CPC ............. G06F 13/4072; G06F 13/4022; G06F 13/4265
See application file for complete search history.

(56) References Cited

U.S. PATENT DOCUMENTS

| | | | | |
|---|---|---|---|---|
| 2007/0291535 A1* | 12/2007 | Eberle | ................... | H04L 49/109 365/174 |
| 2016/0148901 A1* | 5/2016 | Alvarez-Icaza Rivera | ................... | H10B 41/40 257/773 |
| 2017/0063625 A1* | 3/2017 | Philip | ................... | H04L 45/302 |
| 2019/0007310 A1* | 1/2019 | Das Sharma | ........... | H04L 45/52 |
| 2020/0380121 A1* | 12/2020 | Pasricha | ............... | G06F 21/554 |
| 2021/0152469 A1* | 5/2021 | Bharadwaj | ............ | H04L 49/253 |

(Continued)

FOREIGN PATENT DOCUMENTS

CN 113238984 A 8/2021

OTHER PUBLICATIONS

International Search Report and Written Opinion for PCT/US2024/028435 dated Jul. 23, 2024.

(Continued)

*Primary Examiner* — Henry Tsai
*Assistant Examiner* — Harry Z Wang
(74) *Attorney, Agent, or Firm* — Patterson + Sheridan, LLP

(57) ABSTRACT

Embodiments herein describe techniques to extend a network-on-chip (NoC) across multiple IC dice in 3D. An integrated circuit (IC) device includes first and second vertically-stacked IC dice, and an inter-die bus that interfaces between the second die and a NoC packet switch (NPS) of the first die. The inter-die bus may include one or more driver circuits coupled to inter-die links of the inter-die bus. Communications over the inter-die links may be synchronous (e.g., packet-based) or asynchronous with the NPS (e.g., based on a point-to-point protocol, such as an AXI protocol). The inter-die bus may interface with a circuit block of the second IC device via a point-to-point (e.g., AXI) protocol or via a NPS of the second IC die. The IC device may include multiple inter-die buses, which may expand inter-die and intra-die routing options.

19 Claims, 12 Drawing Sheets

(56) References Cited

U.S. PATENT DOCUMENTS

2023/0040323 A1* 2/2023 Ong .................... G06F 15/7825

OTHER PUBLICATIONS

Rahmani, Amir-Mohammad, et al., "An Efficient Hybridization Scheme for Stacked MEsh 3D NoC Archiecture", 2012 20th Euromicro International Conference on Parallel, Distrubuted and Network-based Processing (8 pages).

* cited by examiner

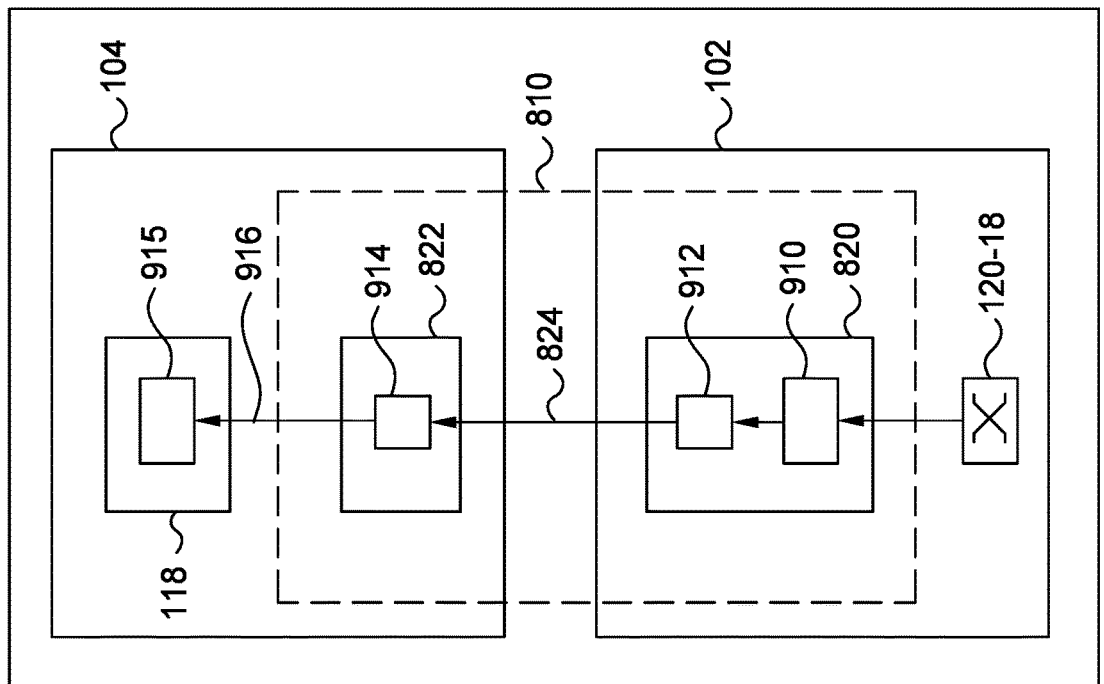
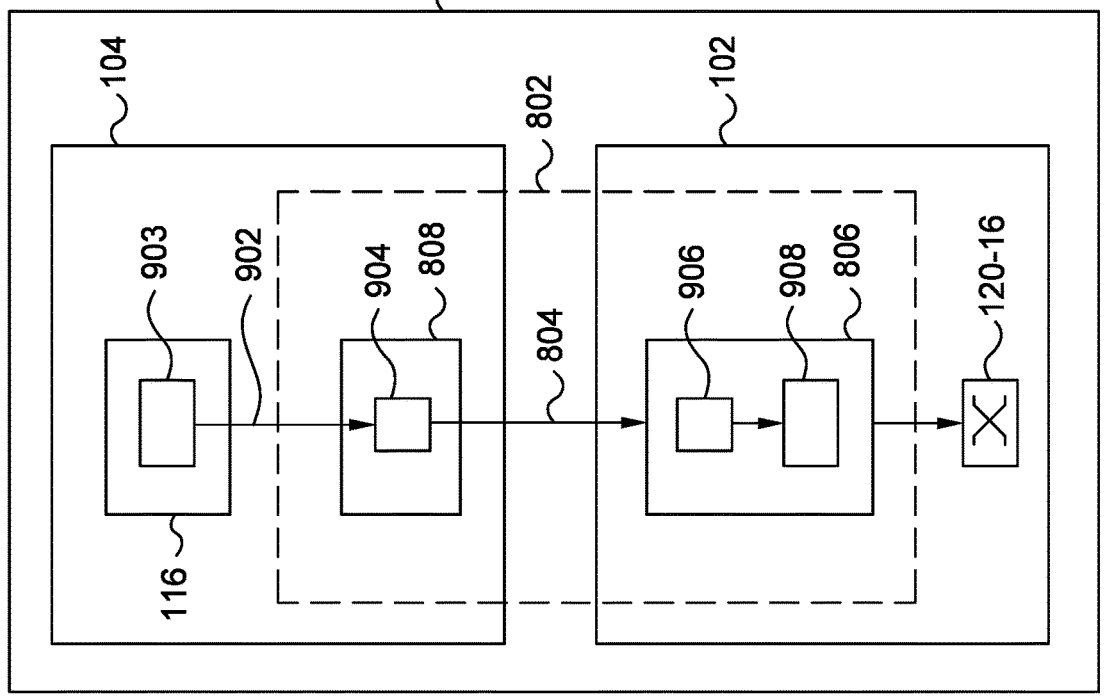
FIG. 9B
FIG. 9A

METHODS TO EXTEND NoC INTERCONNECT ACROSS MULTIPLE DICE IN 3D

TECHNICAL FIELD

Examples of the present disclosure generally relate to methods to extend NoC interconnect across multiple dice in 3D.

BACKGROUND

A packet-switched network-on-chip (NoC) provides an efficient way to communicate amongst circuit blocks, or subsystems of an IC die. As Moore's law reaches limitations of physics, integrated circuit (IC) designers face challenges in further reducing sizes of IC devices. To confront the challenges and increase performance, the semiconductor industry is turning to stacked, or 3-dimensional (3D) IC devices. Extending a NoC across multiple stacked IC dice presents timing and signal strength issues.

SUMMARY

Techniques for extending NoC interconnects across multiple IC die in 3D are described.

One example described herein is an integrated circuit (IC) device that includes first and second vertically-stacked IC dice, where the first IC die comprises network-on-chip (NoC) circuitry, and an inter-die bus configured to interface between the packet-switched NoC and the second IC die, where the inter-die bus includes a driver circuit coupled to inter-die links of the inter-die bus.

Another example described herein is an IC device that includes first and second vertically-stacked IC dice having respective first and second network-on-chip (NoC) packet switches (NPSs) of a 3-dimensional (3D) packet-switched NoC, and an inter-die bus that interfaces between the first and second NPSs asynchronous with the 3D packet-switched NoC, where the inter-die bus includes a driver circuit coupled to inter-die links of the inter-die bus.

Another example described herein is an IC device that includes first and second vertically-stacked IC dice, where the first IC die include a network-on-chip (NoC) packet switch (NPS) of a packet-switched NoC, and a dedicated inter-die bus that interfaces between the NPS and a circuit block of second IC die asynchronous with the packet-switched NoC based on a point-to-point protocol, where the inter-die bus includes a driver circuit coupled to inter-die links of the inter-die bus.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 9A illustrates IC die in which the dedicated inter-die bus provides a unidirectional, asynchronous path from the circuit block of the second IC die to the packet-switched NoC of the first IC die, according to an embodiment.

FIG. 9B illustrates the IC die in which the dedicated inter-die bus provides a unidirectional, asynchronous path from the packet-switched NoC of the first IC die to the circuit block of the second IC die, according to an embodiment.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
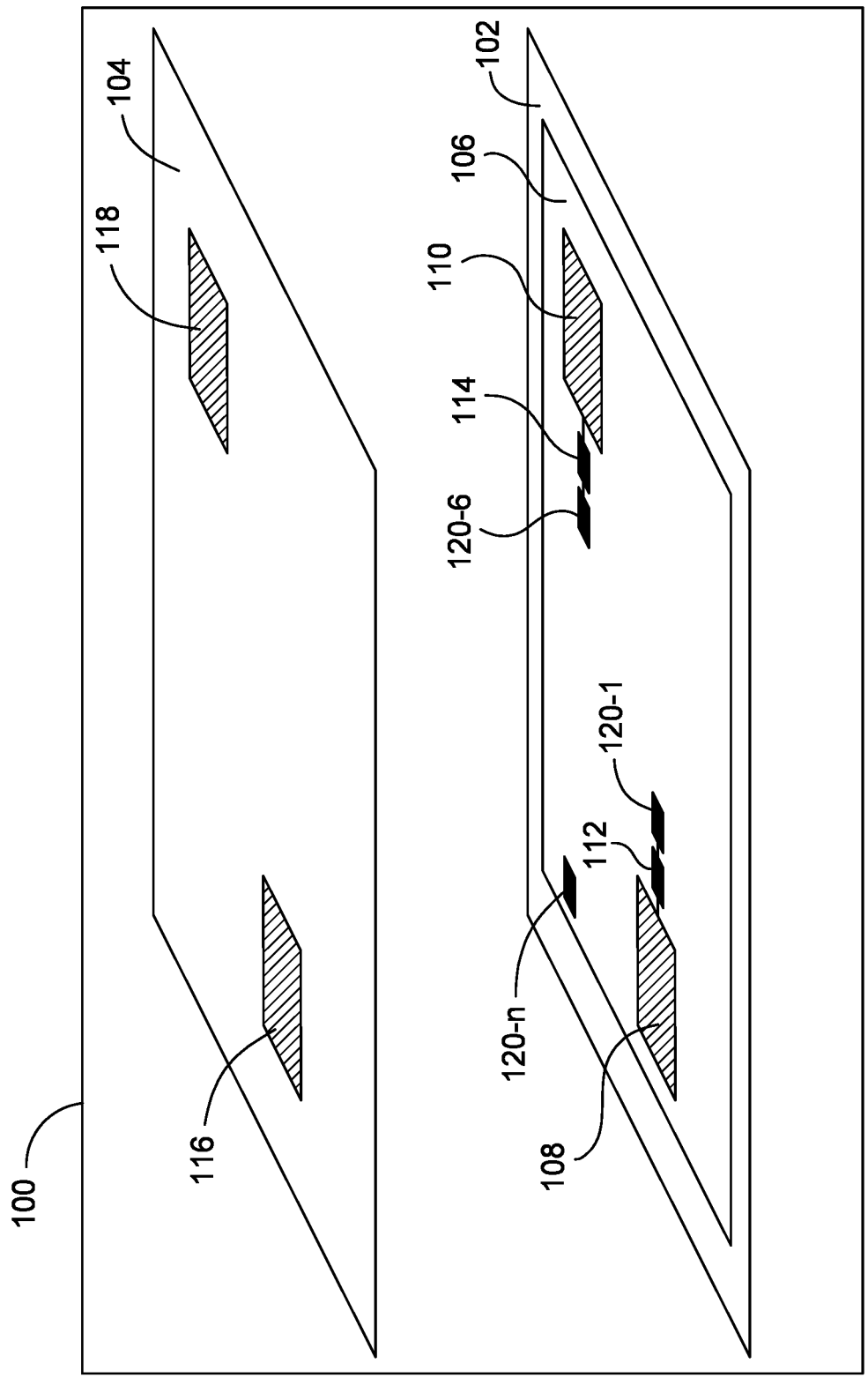
FIG. 1 illustrates a multi-layer integrated circuit (IC) device that includes first and second vertically stacked IC dice containing respective circuit blocks, where the first IC die includes network-on-chip (NoC) circuitry configured to provide a packet-switched NoC, according to an embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe methods to extend NoC interconnect across multiple IC dice in 3D. Embodiments herein may provide relatively low latency, deterministic, and efficient NoC communications between stacked IC dice. Embodiments herein may be useful to provide relatively significant bandwidth between IC dice. Embodiments herein may be useful to expand routing options and/or reduce loading in a conventional 2D NoC. For example, a compiler may route intra-die NoC traffic of a first die (i.e., 2D NoC traffic) to a second die and back to the first die to reduce routing congestion in the first die. Expanded routing options may improve efficiency (e.g., in artificial intelligence (AI) based IC design), and/or may provide more efficient access to memory resources.

FIG. 1 illustrates a multi-layer integrated circuit (IC) device 100 that includes first and second vertically stacked IC dice 102 and 104, according to an embodiment. IC device 100 may include one or more additional IC dice, above, below, and/or between IC dice 102 and 104.

IC dice 102 and 104 may include one or more blocks of circuitry, which may represent subsystems of a system-on-chip (SoC). In the example of FIG. 1, IC die 102 includes circuit blocks 108 and 110, and IC die 104 includes circuit blocks 116 and 118.

IC die 102 further includes network-on-chip (NoC) circuitry 106 that provides a packet-switched NoC. NoC circuitry 106 includes NoC packet switches (NPSs) 120-1 through 120-n (collectively, NPSs 120) that route packets within the packet-switched NoC and serve as access points to the packet-switched NoC. In FIG. 1, circuit blocks 108 and 110 may communicate with one another and/or with an external device over the packet-switched NoC via respective interface circuits 112 and 114, and respective NPSs 120-1 and 120-6. Circuit blocks 108 and 110 may be referred to as endpoints of the packet-switched NoC.

Interface circuits 112 and 114 packetize and/or de-packetize communications between the packet-switched NoC and respective circuit blocks 108 and 110. Interface circuits 112 and 114 may convert between a NoC packet protocol (NPP) of the packet-switched NoC and a point-to-point protocol of circuit blocks 108 and 110. The point-to-point protocol may be asynchronous with the NPP. The point-to-point protocol may include multiple channels, which may include, without limitation, a write address channel (AW), a write data channel (W), a read address channel (AR), and a read data channel (R). Where the channels are unidirectional, the channels may further include a write response channel (B) to pass responses back to a requestor. Read responses may be returned to a requestor over the read data channel (R). Separate and independent read and write channels may be useful to support concurrent read and write operations and maximize a bandwidth of the interface. Separate address and data channels for read and write transfers may further improve bandwidth.

Interface circuits 112 and 114 may include master and/or slave interface circuitry. For example, interface circuit 112 may include master interface circuitry that permits circuit block 108 to initiate communications (e.g., memory access requests) with other endpoints (e.g., circuit block 110), and interface circuit 114 may include slave interface circuitry that permits circuit block 110 to service requests from other endpoints (e.g., circuit block 108). Interface circuit 112 may further include slave interface circuitry that permits circuit block 108 to service requests from other endpoints. Example master and slave interface circuitry are provided below with reference to FIGS. 2 through 4. Interface circuits 112 and 114 are not, however, limited to master and/or slave circuitry.

Interface circuits 112 and 114 may conform to a point-to-point protocol such as, without limitation, an Advanced extensible interface (AXI) on-chip communication bus protocol developed by ARM of Cambridge, England.

Figure 2:
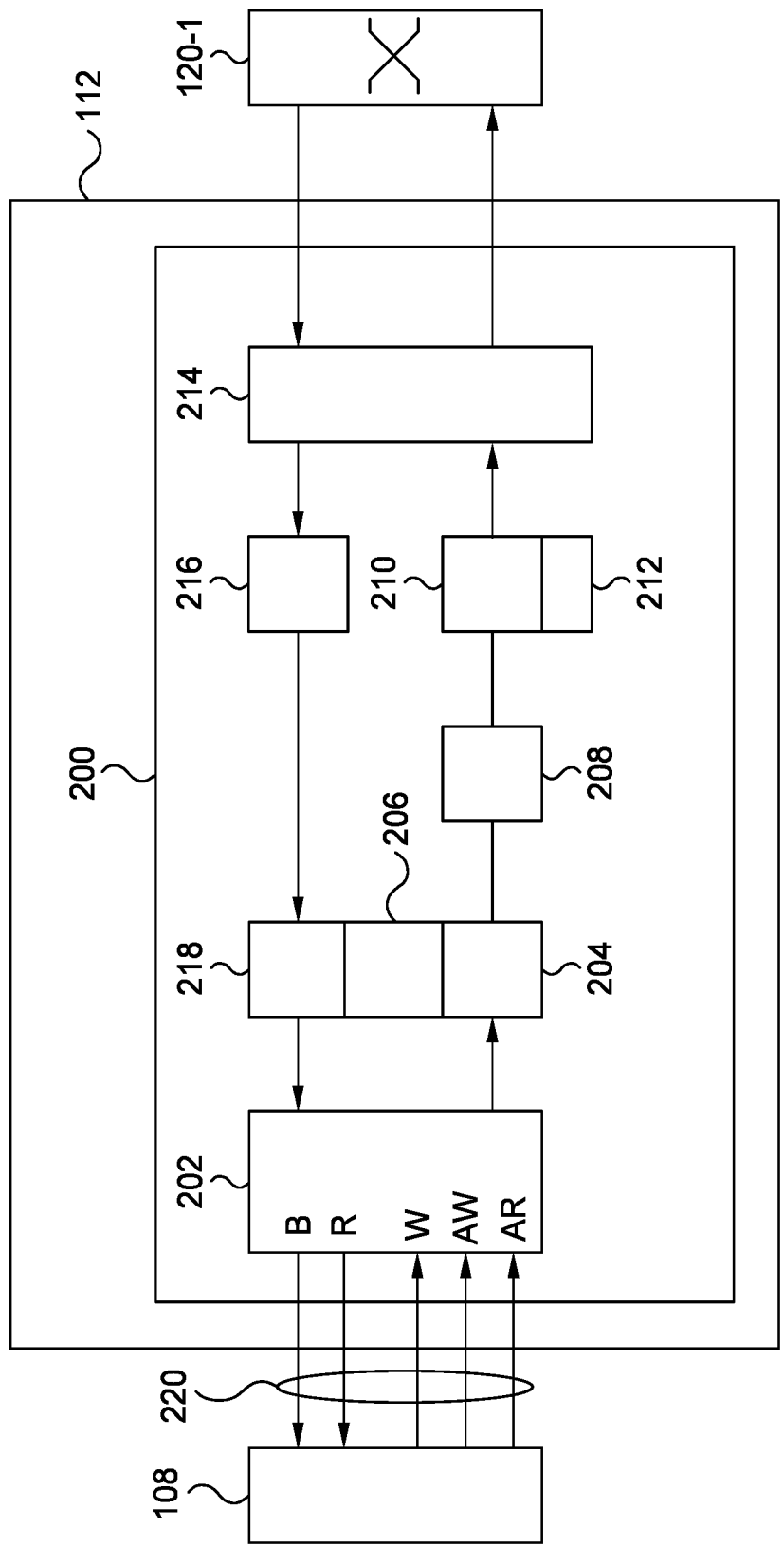
FIG. 2 is a block diagram of an interface circuit of the first IC die including a NoC master unit (NMU), according to an embodiment.

FIG. 2 is a block diagram of interface circuit 112 including a NoC master unit (NMU) 200, according to an embodiment. An outgoing path of NMU 200 includes master interface circuitry 202 that interfaces with circuit block 108. Master interface circuitry 202 may include an AXI master interface. The outgoing path further includes packetizing circuitry 204, an address map 206, a read re-tagging buffer 208, quality-of-service (Qos) order control circuitry 210, VC mapping circuitry 212, and rate matching and asynchronous data boundary crossing circuitry 214. A response path of NMU 200 includes rate matching and asynchronous data boundary crossing circuitry 214, reordering circuitry 216, de-packetizing circuitry 218, address map 206, and master interface circuitry 202. Operation of NMU 200 is described further below with reference to FIG. 4. Interface circuit 112 may further include a NoC slave unit (NSU), such as described below with reference to FIG. 3.

Figure 3:
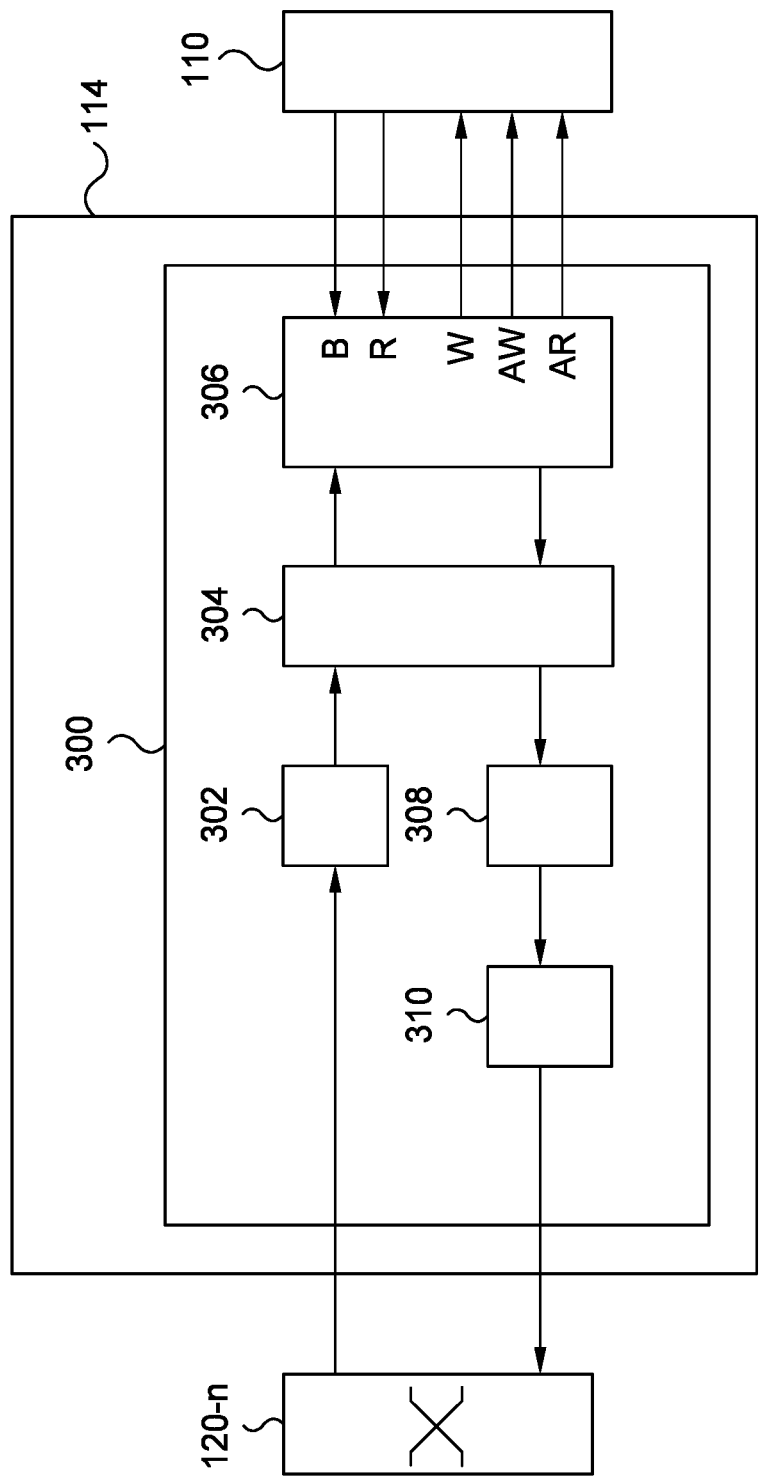
FIG. 3 is a block diagram of an interface circuit of the first IC die including a NoC slave unit (NSU), according to an embodiment.

FIG. 3 is a block diagram of interface circuit 114 including a NoC slave unit (NSU) 300, according to an embodiment. An incoming path of NSU 300 includes de-packetizing circuitry 302, rate matching and asynchronous data boundary crossing circuitry 304, and slave interface circuitry 306 that interfaces with circuit block 110. Slave interface circuitry 306 may conform to an AXI protocol. Slave interface circuitry 306 may include an AXI slave interface. A response path of NSU 300 includes slave interface circuitry 306, rate matching and asynchronous data boundary crossing circuitry 304, packetizing circuitry 308, and QoS circuitry 310. Operation of NSU 300 is described further below with reference to FIG. 4. Interface circuit 114 may further include a NMU.

Figure 4:
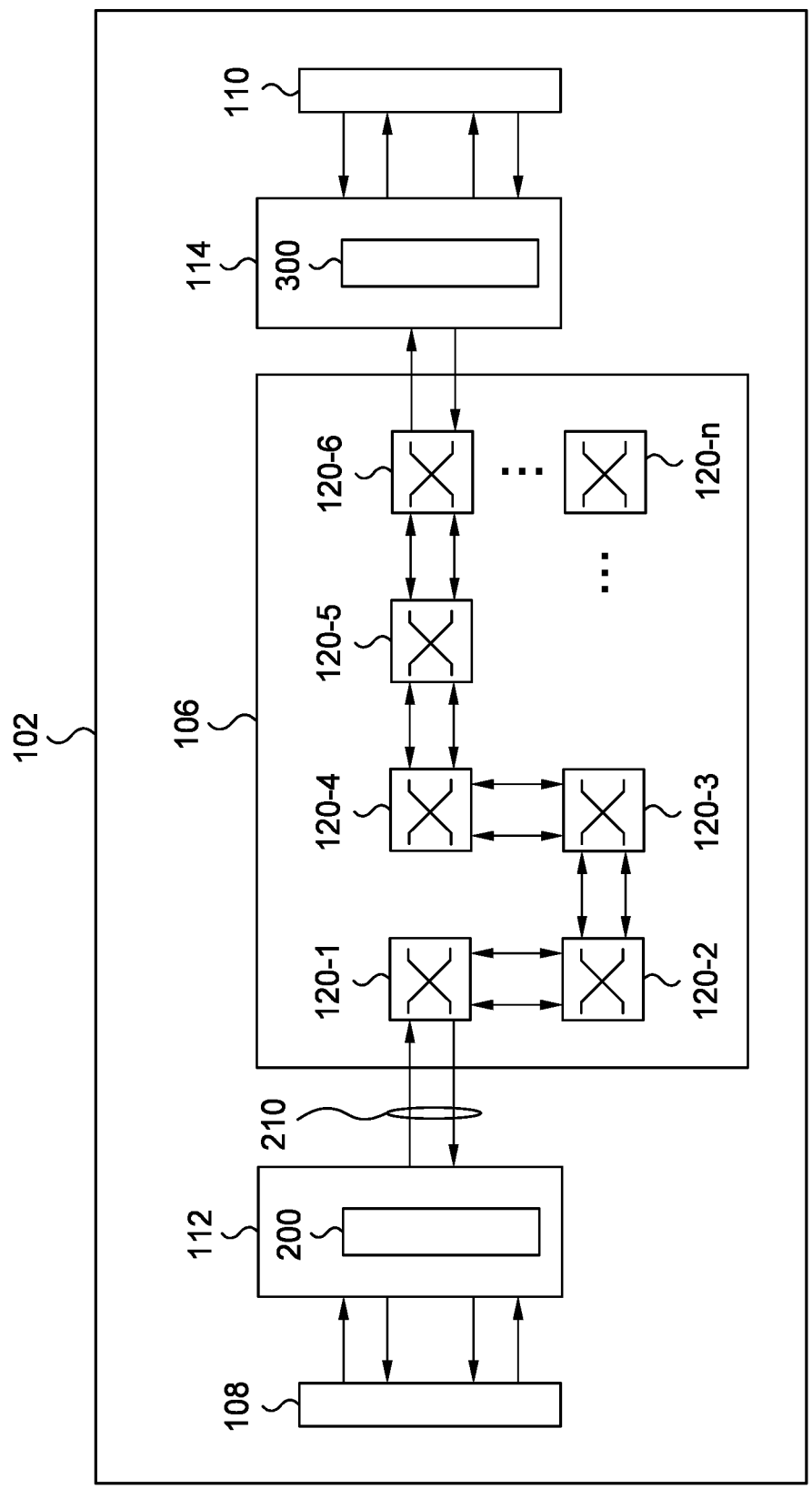
FIG. 4 illustrates a communication path through the packet-switched NoC, according to an embodiment.

FIG. 4 illustrates a communication path through the packet-switched NoC, between circuit block 108 and circuit block 110, according to an embodiment. In the example of FIG. 4, interface circuit 112 includes NMU 200, and interface circuit 114 includes NSU 300. In this example, circuit block 108 acts as a master and circuit block 110 acts as a slave FIG. 4 is described below for read and write operations initiated by circuit block 108 and directed to circuit block 110.

Upon receipt of a read request from circuit block 108, NMU 200 packetizes the read request and forwards packetized read request to destination NSU 300 via NPS 120-1. NMU 200 may perform one or more of the following functions. NSU 300 may perform asynchronous crossing and rate-matching (e.g., from an AXI master clock domain to a clock domain of the packet-switched NoC), destination lookup of destination NSU 300, address remapping (in cases of virtualization), AXI conversion of the read request (AxAddr, AxSize, AxLen, AxBurst, AxCache) from an AxSizeMaster protocol to a AxSizeNoC protocol, read chopping, read tagging and read-reorder buffer entry insertion to keep track of out-of-order read data returns, packetizing the read request into the NPP, rate limiting and error correction code (ECC) generation, VC-mapping, VC-arbitration, and/or data bus inversion (DBI) generation.

In the example of FIG. 4, the packetized read request passes through NPSs 120-1 through 120-6. NPS 120-1 may perform destination table lookup for a target output port of NPS 120-1. NPS 120-1 may also perform least recently used (LRU) arbitration at the output port.

Upon receipt of the packetized read request, NSU 300 de-packetizes the read request packets and provides the de-packetized read request to circuit block 110 based on the point-to-point protocol. NSU 300 may perform one or more of the following functions. NSU 300 may perform ECC checking and correction, AXI-ID compression and AXI exclusive access monitoring, read chopping for downsizing, read tracker entry insertion to keep track of read data interleaving, AXI conversion of the request from the NPP to a protocol of NSU 300 (e.g., from the AxSizeNoC protocol to a AxSizeSlave protocol), asynchronous crossing and rate-matching from the clock domain of the packet-switched NoC to an AXI slave clock domain, and conversion of the read request to a protocol of circuit block 110.

Upon receipt of a read response from circuit block 110, NSU 300 packetizes the response and forwards the packetized response to circuit block 108 via NPS 120-6. NSU 300 may perform one or more of the following functions. NSU 300 may perform asynchronous crossing and rate-matching from the AXI slave clock domain to the clock domain of the packet-switched NoC, AXI conversion of the read response from the AxSizeSlave to the AxSizeNoC, re-assembly of the read data in a read tracker to match the AxSizeNoC, packetizing of the read response into the NPP of the packet-switched NoC, ECC generation, and VC-mapping and VC-arbitration.

Upon receipt of the read response packets, NMU 200 de-packetizes the read response packets and provides the de-packetized read response to circuit block 108 based on the point-to-point protocol. NMU 200 may perform one or more of the following functions. NMU 200 may perform data DBI and ECC checking, ECC correction and de-packetizing of the read response packets, re-assembly and reordering of the read data into the request order and AxSizeMaster boundary, AXI conversion of the read response data from the AxSizeNoC to the AxSizeMaster, asynchronous crossing and rate-matching from the clock domain of the packet-switched NoC to a clock domain of NMU 202.

When NMU 200 receives a write request from circuit block 108, NMU packetizes the write request and forwards the packetized write request to destination NSU 300 via NPS 120-1. NMU 200 may perform one or more of the following functions. NMU 200 may perform asynchronous crossing and rate-matching from a clock domain of NMU 200 to the clock domain of the packet-switched NoC, destination lookup of destination NSU 300, address remapping (in cases of virtualization). AXI conversion of the write request (AxAddr, AxSize, AxLen, AxBurst, AxCache, writestrobe, and writedata) from the AxSizeMaster protocol to the AxSizeNoC protocol, write chopping, single-slave-per-id (SSID) check for outstanding write transactions with the same AXI-ID but with a different NoC destination ID (DST), write tracker entry insertion, packetizing of the write request into the NPP, rate limiting, ECC generation, VC-mapping, VC-arbitration, and DBI generation.

Upon receipt of the NPP-formatted write request packets. NSU 300 de-packetizes the write request packets and provides the de-packetized write request to circuit block 110 based on the point-to-point protocol. NSU 300 may perform one or more of the following functions. NSU 300 may perform de-packetizing of the write request packets, ECC checking and correction, write chopping for downsizing, write tracker entry insertion, AXI conversion of the request from the AxSizeNoC protocol to the AxSizeSlave protocol, and asynchronous crossing and rate-matching from the clock domain of the packet-switched NoC to the clock domain of NSU 300.

Upon receipt of a write response (e.g., confirmation) from circuit block 110, NSU 300 packetizes the write confirmation and forwards the write packets to NMU 200 via NPS 120-6. NSU 300 may perform one or more of the following functions. NSU 300 may perform asynchronous crossing and rate-matching from the clock domain of NSU 300 to the clock domain of the packet-switched NoC, merge the write responses in write tracker (in cases of write chopping), packetize the write response in accordance with the NPP, generate ECC, and perform VC-mapping and VC-arbitration.

Upon receipt of the NPP-formatted write response packets. NMU 200 de-packetizes the write response packets and provides the de-packetized write response to circuit block 108 based on the point-to-point protocol. NMU 200 may perform one or more of the following functions. NMU 200 may perform DBI and ECC checking, ECC correction and de-packetizing, merge write responses (in cases where write chopping is performed during write requests), and asynchronous crossing and rate-matching from the clock domain of the packet-switched NoC to the clock domain of NMU 200.

In FIG. 1. IC device 100 may include one or more inter-die busses that provide communication paths between IC die 102 and the packet-switched NoC of IC die 104. Inter-die busses may be useful to provide permit one or more circuit blocks of IC die 104 to communicate with one or more endpoints of the packet-switched NoC, examples of which are provided further below.

An inter-die bus may be synchronous with the packet-switched NoC (e.g., packet-based) or asynchronous with the packet-switched NoC (e.g., point-to-point, or AXI based). An inter-die bus may include master and/or slave circuitry. An inter-die bus may be unidirectional or bi-directional (a unidirectional master and/or slave based inter-die bus may include an inherent return path such as described with reference to FIGS. 1-4).

In an embodiment, IC die 104 includes NoC circuitry that is fully integrated with NoC circuitry 106 via one or more inter-die buses to provide a 3D packet-switched NoC. In this example, a circuit block of IC die 104 is treated as an endpoint of the 3D packet-switched NoC. Examples are provided below with reference to FIGS. 5, 6A through 6C, and FIGS. 7A through 7C.

In another embodiment, an inter-die bus provides a dedicated communication path between a circuit block of IC die 104 and the packet-switched NoC of IC die 102, such that the circuit block of IC die 104 is treated as an endpoint of the packet-switched NoC. The dedicated communication path may unidirectional. A unidirectional dedicated inter-die bus may be useful where the circuit block of IC die communicates only as a master device (e.g., to access a memory device) or only as a slave device (e.g., a memory device accessed by a master device). A unidirectional dedicated inter-die bus may conserve resources (e.g., design resources, power consumption, and/or area of IC die 104), relative to an embodiment in which IC die 104 is provided with NoC circuitry. 3D connection resources may be particular costly to implement. Conservation of 3D connection resources may thus be particularly useful, Unidirectional examples are provided further below.

Figure 5:
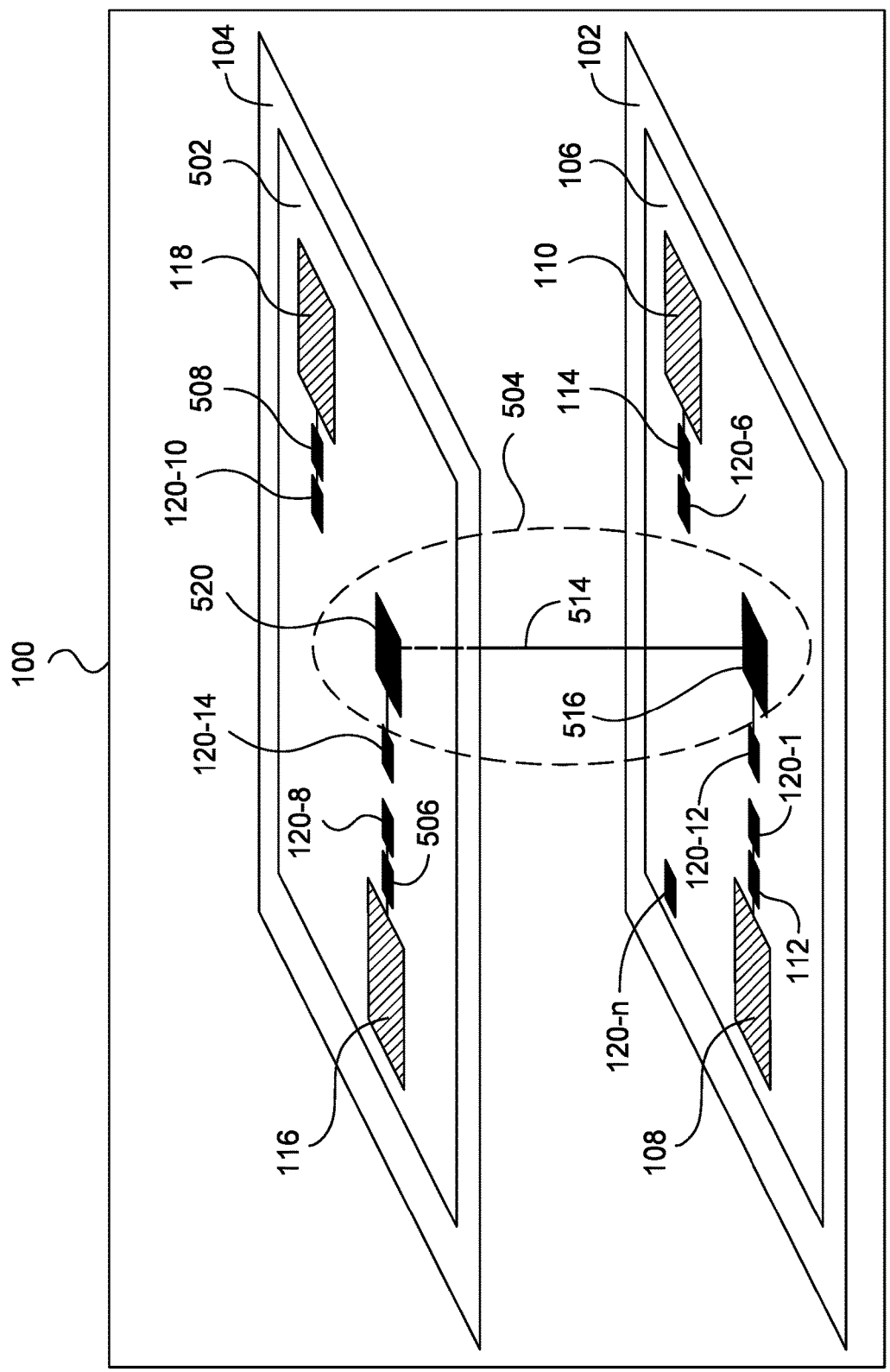
FIG. 5 illustrates the IC device in which the second IC die includes NoC circuitry, and the IC device further includes an inter-die bus to provide a 3-dimensional (3D) packet-switched NoC, according to an embodiment.

FIG. 5 illustrates IC device 100 in which IC die 104 includes NoC circuitry 502, and IC device 100 further includes an inter-die bus 504 to provide a 3-dimensional (3D) packet-switched NoC, according to an embodiment. NoC circuitry 502 is fully integrated with NoC circuitry 106, in that NoC circuitry 502 is essentially an extension of NoC circuitry 106 and operates synchronously with NoC circuitry 106. The 3D packet-switched NoC may be useful to permit inter-die communications between circuit blocks of IC die 102 and circuit blocks of IC die 104 and/or to expand routing options for a NoC compiler.

IC die may include multiple inter-die busses, which may be useful to further expand routing options for a NoC compiler. For example, a NoC compiler may route NoC communications between circuit blocks 108 and 110 via inter-die bus 504 and one or more additional inter-die busses (e.g., based on congestion considerations and/or efficiency). The NoC compiler treats NPSs of IC dice 102 and 104 as being within a common address space.

In FIG. 5, circuit blocks 116 and 118 access the 3D packet-switched NoC via respective NoC interface circuits 506 and 508 and NPSs 120-8 and 120-10, such as described further above with reference to FIGS. 1 through 4. In FIG. 5, circuit blocks 108, 110, 116, and 118 may be referred to as endpoints of the 3D packet-switched NoC.

Further in FIG. 5, inter-die bus 504 interfaces between a NPS 120-12 of IC die 102 and a NPS 120-14 of IC die 104. Alternatively, inter-die bus 504 may interface between another NPS of IC die 102 (e.g., any of NPSs 120-1 through 120-6 and 120-n in FIG. 2), and/or another NPS of IC die 104 (e.g., NPS 120-8 or 120-10).

Inter-die bus 504 includes links 514 (e.g., metal-filled vias) that extend between IC dice 102 and 104. Inter-die bus 504 further includes interface circuitry 516 that interfaces between links 514 and NPS 120-12, and interface circuitry 520 that interfaces between links 514 and NPS 120-14. Communications over links 514 may be synchronous or asynchronous with the clock domain of the 3D packet-switched NoC. Example embodiments of inter-die bus 504 are provided below with reference to FIGS. 6A through 6C and 7A through 7C.

Figure 6A:
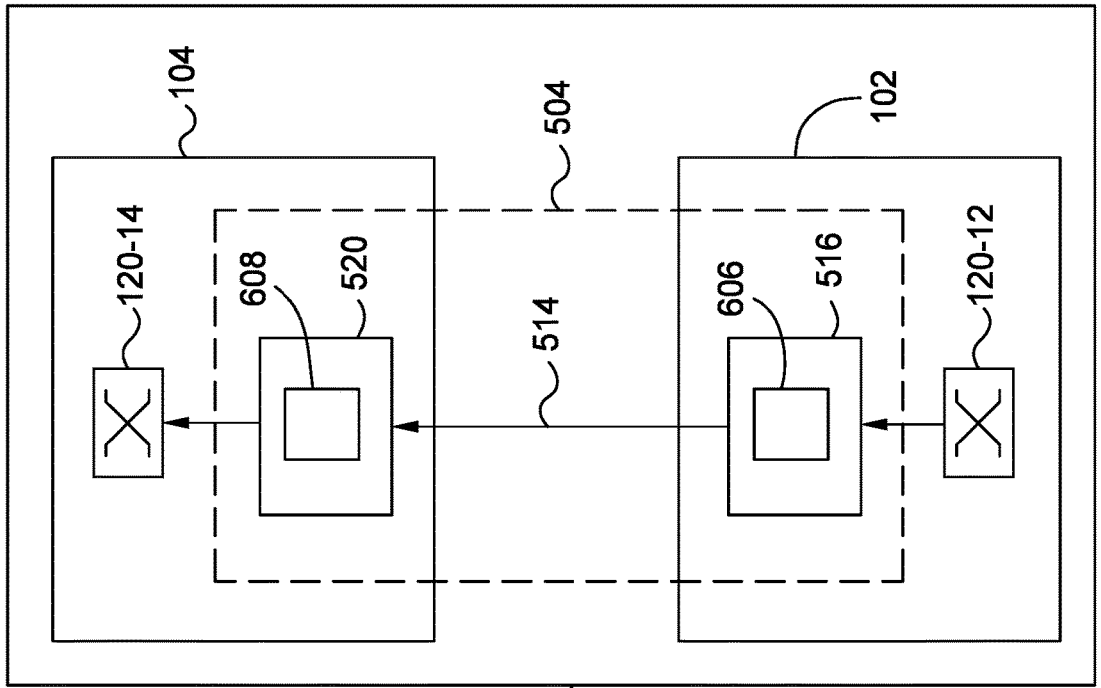
FIG. 6A illustrates the IC device 100 in which the inter-die bus includes a driver circuit that drives packets from the first IC die to the second IC die, synchronously with the 3D packet-switched NoC, according to an embodiment.

FIG. 6A illustrates IC device 100 in which inter-die bus 504 forwards packets from NPS 120-14 to NPS 120-12, synchronously with the 3D packet-switched NoC, according to an embodiment. The example of FIG. 6A may be useful where inter-die bus 504 is used for unidirectional communications from IC die 104 to IC die 102.

In FIG. 6A, interface circuitry 520 includes a driver circuit 602 that drives packets received from NPS 120-14 over links 514, and interface circuitry 516 includes a driver circuit 604 that boosts signals received over links 514. Driver circuits 602 and 604 may include high-impendence current driver circuits. Driver circuits 602 and 604 may be useful to overcome losses associated with links 514.

Figure 6B:
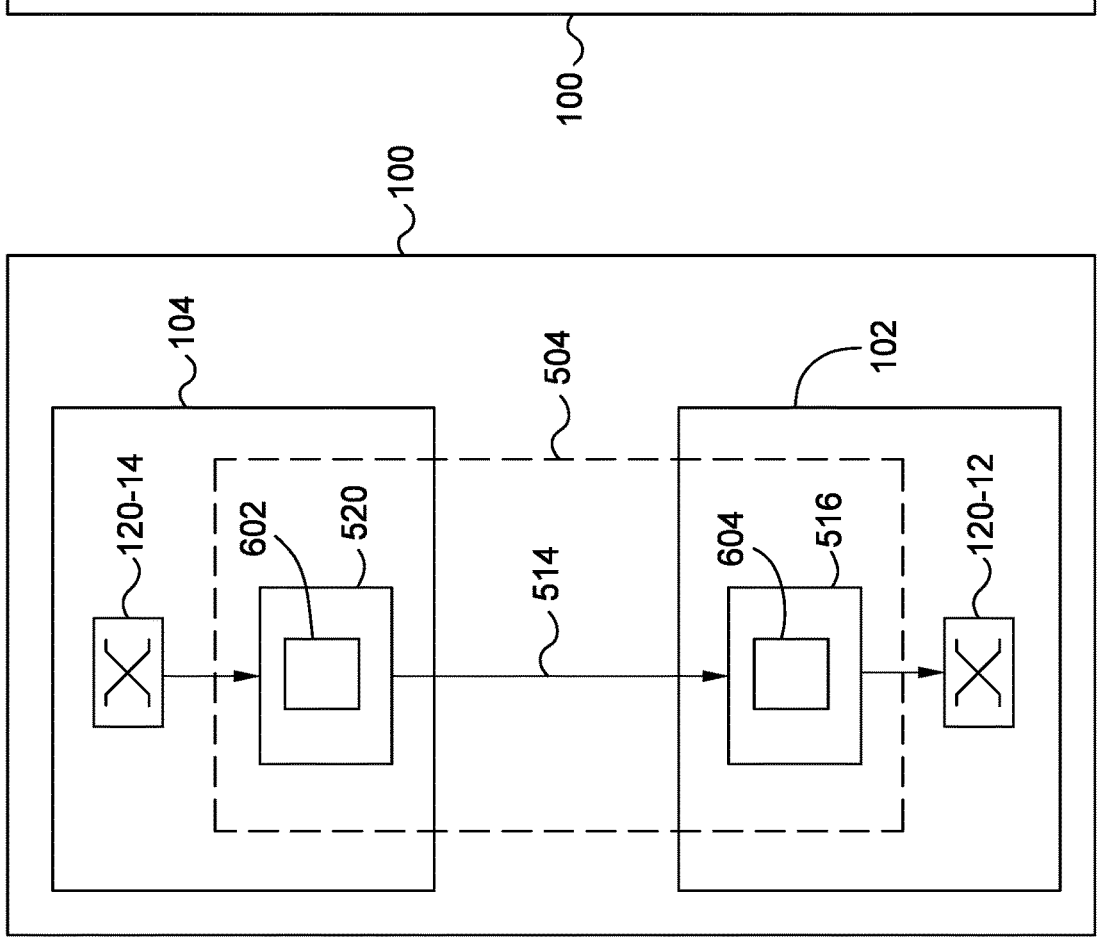
FIG. 6B illustrates the IC device in which the inter-die bus includes a driver circuit that drives packets from the second IC die to the first IC, synchronously with the 3D packet-switched NoC, according to an embodiment.

FIG. 6B illustrates IC device 100 in which inter-die bus 504 forwards packets from NPS 120-12 to NPS 120-14, synchronously with the 3D packet-switched NoC, according to an embodiment. The example of FIG. 6B may be useful where inter-die bus 504 is used for unidirectional communications from IC die 102 to IC die 104.

In FIG. 6B, interface circuitry 516 includes a driver circuit 606 that drives packets received from NPS 120-12 over links 514, and interface circuitry 520 includes a driver circuit 608 that boosts signals received over links 514. Driver circuits 606 and 608 may include high-impendence current driver circuits.

Figure 6C:
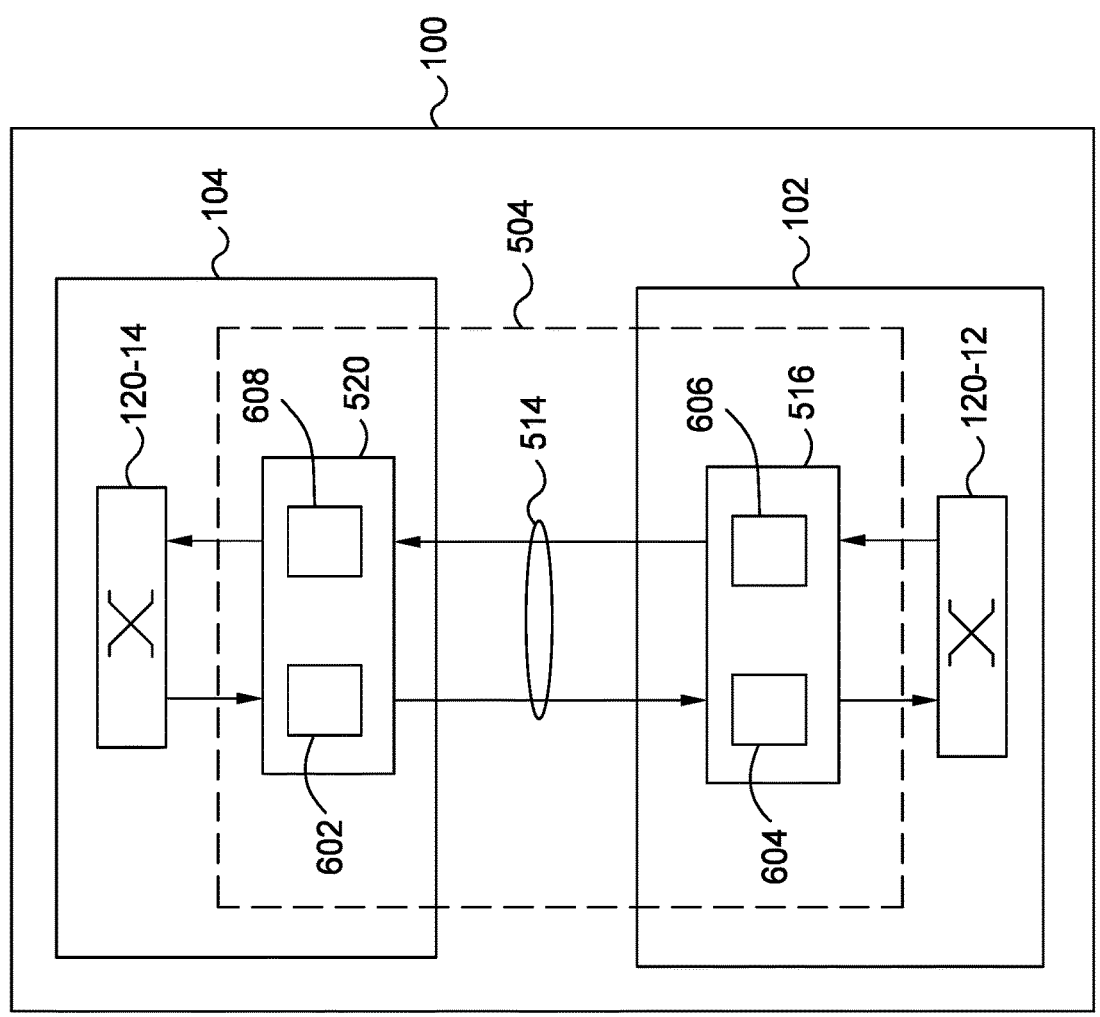
FIG. 6C illustrates the IC device 100 in which the inter-die bus includes features of FIGS. 6A and 6B, according to an embodiment.

FIG. 6C illustrates IC device 100 in which inter-die bus 504 includes features described above with respect to FIGS. 6A and 6B, according to an embodiment. The example of FIG. 6C may be useful where inter-die bus 504 is used to for bi-directional communications between IC die 102 and IC die 104.

In the examples of FIGS. 6A-4C, inter-die bus 504 transmits packets over links 514, synchronous with the clock domain of the 3D packet-switched NoC. In examples presented below with reference to FIGS. 7A-7C, inter-die bus 504 transmits de-packetized data over links 514, asynchronous with the clock domain of the 3D packet-switched NoC (e.g., via a point-do-point protocol). The synchronous examples of FIGS. 6A-6C may utilize fewer links 514 than the asynchronous examples of FIGS. 7A-7C, whereas asynchronous examples of FIGS. 7A-7C may avoid or reduce timing issues between the clock domain of the 3D packet-switched NoC and a clock domain of inter-die bus 504.

Figures 7A, 7B:
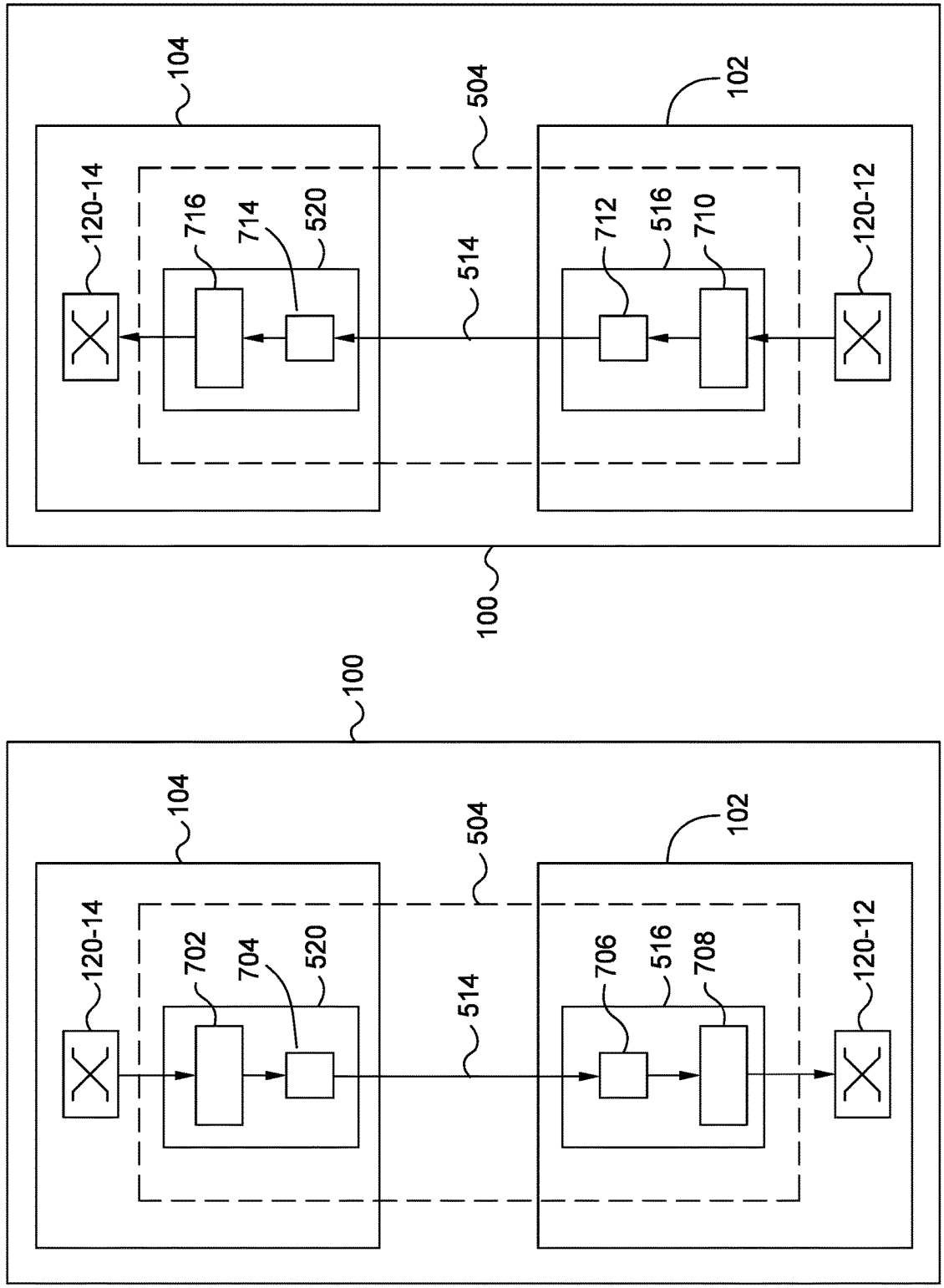
FIG. 7A illustrates the IC device in which the inter-die bus de-packetizes packets received from the first IC die, and drives the de-packetized packets to the second IC die using a point-to-point protocol, asynchronously with the 3D packet-switched NoC, according to an embodiment.
FIG. 7B illustrates the IC device in which the inter-die bus de-packetizes packets received from the second IC die, and drives the de-packetized packets to the first IC die using the point-to-point protocol, asynchronously with the 3D packet-switched NoC, according to an embodiment.

FIG. 7A illustrates IC device 100 in which inter-die bus 504 de-packetizes packets received from NPS 120-12 (e.g., converts the packets from the NPP of the 3D packet-switched NoC to a point-to-point protocol), and transmits the point-to-point protocol formatted communications over links 514, asynchronously with respect to the clock domain of the 3D packet-switched NoC, according to an embodiment.

In the example of FIG. 7A, interface circuitry 520 includes master interface circuitry 702 that de-packetizes packets received from NPS 120-14 (i.e., converts the packets from the NPP of the 3D packet-switched NoC to a point-to-point (e.g., AXI) protocol, effectively de-coupling the de-packetized data from the clock domain of the 3D packet-switched NoC. Master interface circuitry 702 may include a NMU, such as described further above with reference to FIGS. 2 and 4. Interface circuitry 520 further includes a driver circuit 704 that drives the output of master interface circuitry 702 over links 514. Driver circuit 704 may include a high-impedance current driver circuit. Interface circuitry 520 may include another driver circuit for a return path (e.g., for read response data and/or write confirmations). In an embodiment, a forward path and return path may use the same 3D connections/wires, and may include driver circuits for each direction. Alternatively, the forward path and the return path may use respective dedicated 3D connections/wires of links 514.

Further in the example of FIG. 7A, interface circuitry 516 includes a driver circuit 706 that boosts signals received over links 514. Driver circuit 706 may include a high-impedance current driver circuit. Driver circuit 706 may be omitted in some embodiments. Interface circuitry 516 further includes slave interface circuitry 708 that packetizes the output of driver circuit 706 (e.g., converts the output of driver circuit 706 from the NPP of the 3D switched-packet NoC to the point-to-point protocol). Slave interface circuitry 708 may include a NSU, such as described further above with reference to FIGS. 3 and 4.

FIG. 7B illustrates IC device 100 in which inter-die bus 504 de-packetizes packets received from NPS 120-12 (e.g., converts the packets the NPP of the 3D packet-switched NoC to the point-to-point protocol), and transmits the point-to-point protocol formatted signals over links 514 asynchronously with respect to the clock domain of the 3D packet-switched NoC, according to an embodiment.

In the example of FIG. 7B, interface circuitry 516 includes master interface circuitry 710 that de-packetizes the packets received from NPS 120-12. Master interface circuitry 710 may include a NMU, such as described further above with reference to FIGS. 2 and 4. Interface circuitry 516 further includes a driver circuit 712 that drives the output of master interface circuitry 710 over links 314. Driver circuit 712 may include a high-impedance driver circuit.

Further in the example of FIG. 7B, interface circuitry 520 includes a driver circuit 714 that boosts signals received over links 514. Driver circuit 714 may include a high-impedance driver circuit. Driver circuit 714 may be omitted in some embodiments. Interface circuitry 520 further includes slave interface circuitry 716 that packetizes the output of driver circuit 714 (e.g., converts from the point-to-point protocol to the NPP of the 3D switched-packet NoC). Slave interface circuitry 716 may include a NSU, such as described further above with reference to FIGS. 3 and 4.

Figure 7C:
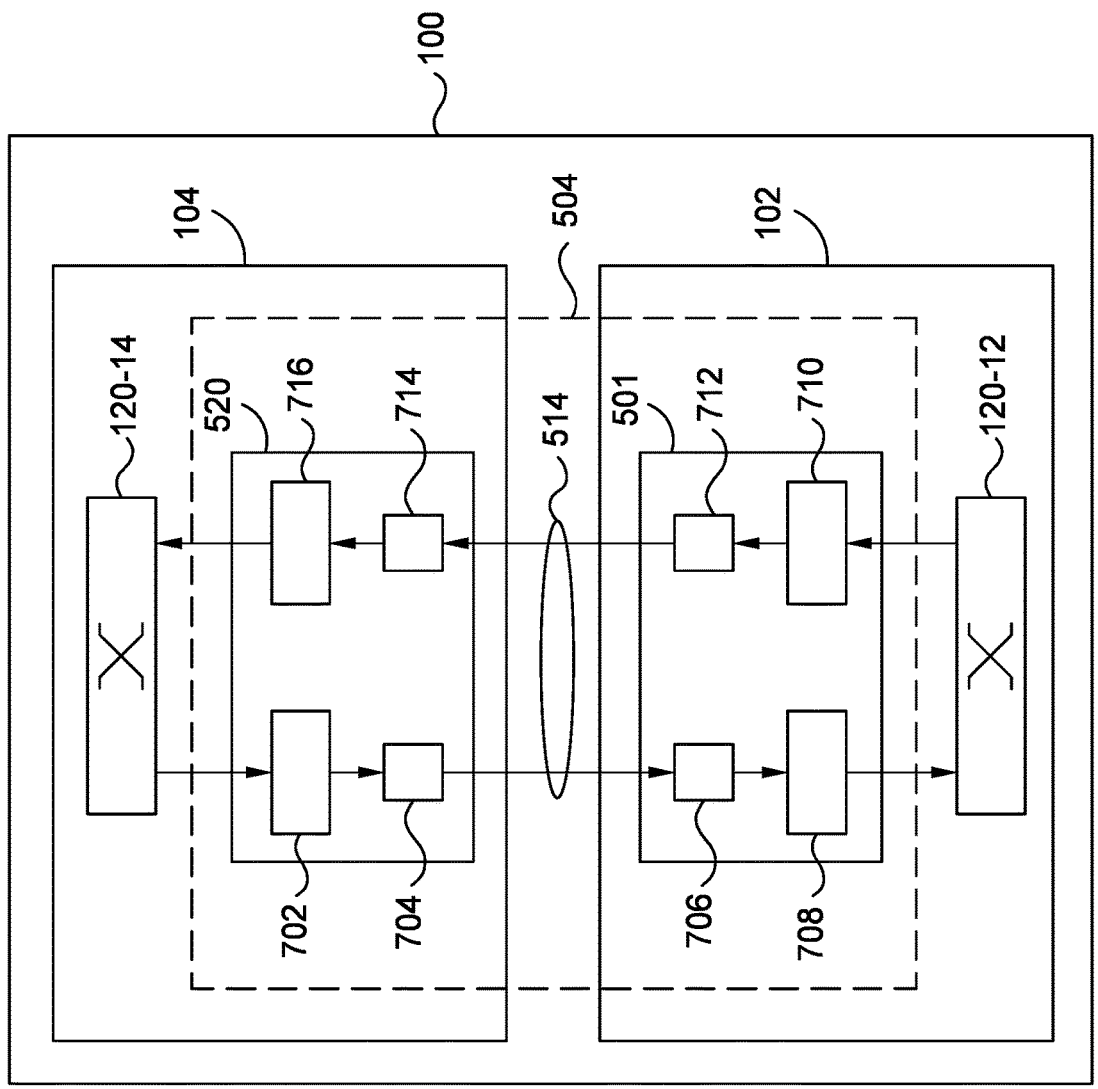
FIG. 7C illustrates the IC device in which the inter-die bus includes features of FIGS. 7A and 7B, according to an embodiment.

FIG. 7C illustrates IC device 100 in which inter-die bus 504 includes features described above with respect to FIGS. 7A and 7B, according to an embodiment. In the example of FIG. 7C, inter-die bus 504 transmits de-packetized data between NPS 120-12 and NPS 120-14, bi-directionally and asynchronously with respect to the clock domain of the 3D packet-switched NoC.

In FIGS. 7A, 7B, and/or 7C, a bandwidth of inter-die bus 504 may be configurable (e.g., to utilize a selectable number of links 514). Configuration parameters may be provided to interface circuitry 516 and/or interface circuitry 520. Bandwidth configurability may be useful to match a bandwidth of inter-die bus 504 to a bandwidth of the 3D packet-switched NoC, such as where a transmission rate of inter-die bus 504 differs from a transmission rate of the 3D packet-switched NoC). For example, and without limitation, inter-die bus 504 may be configurable for a transmission rate of 128 bits per cycle or 256 bits per cycle. Where the 3D packet-switched NoC operates at 1 GHz with a transmission rate of 128 bits per cycle, and where inter-die bus transmits over links 514 at 500 MHz, the inter-die bus 504 may be configured for the transmission rate of 256 bits per cycle.

Figure 8:
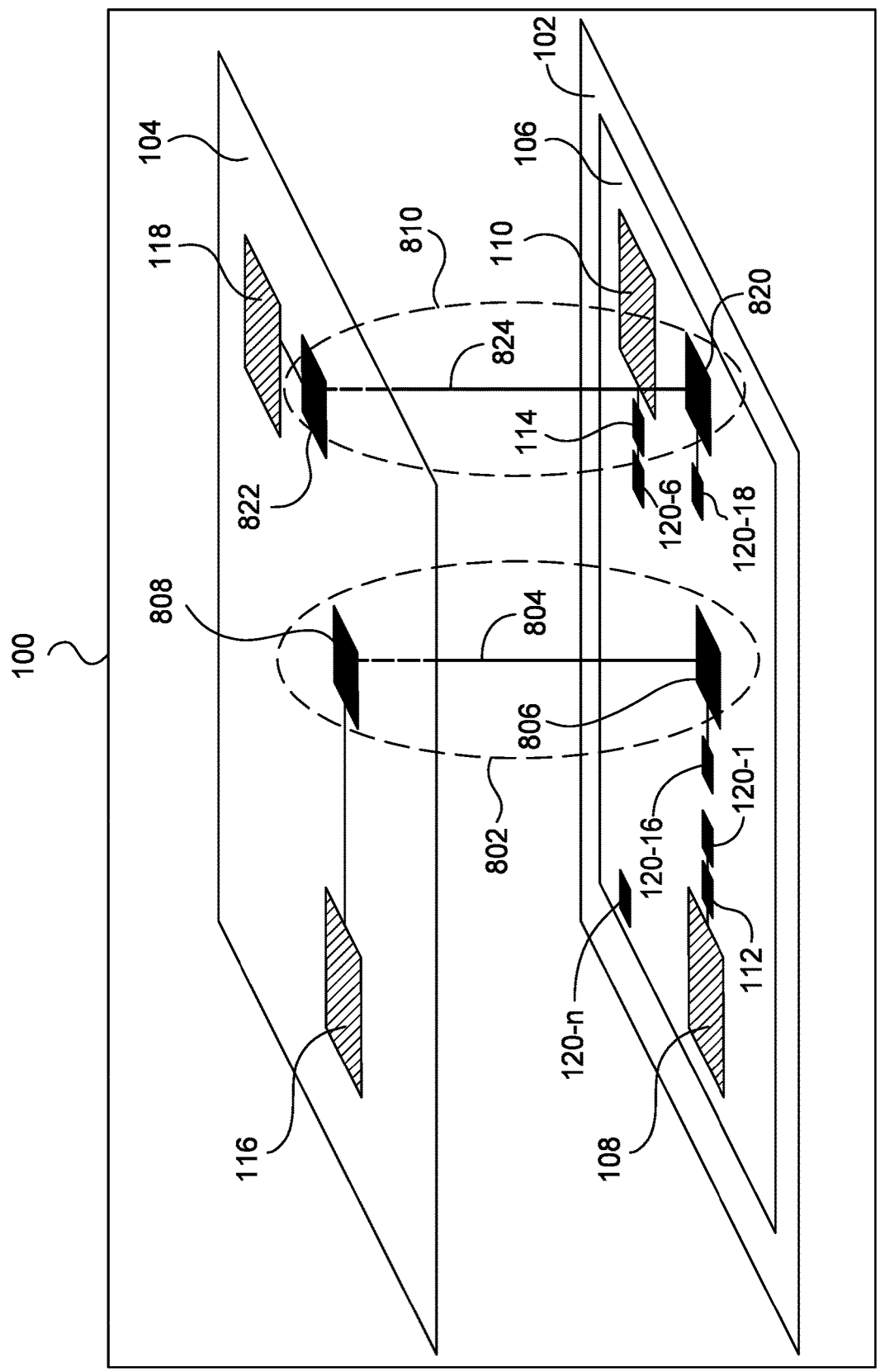
FIG. 8 illustrates the IC device 100, further including an inter-die bus that provides a dedicated, asynchronous communication path between a circuit block of the second IC die and the packet-switched NoC of the first IC die, such that circuit block of the second IC die serves as an endpoint of the packet-switched NoC, according to an embodiment.

FIG. 8 illustrates IC device 100, further including an inter-die bus 802 that provides a dedicated, asynchronous communication path between circuit block 116 of IC die 104 and the packet-switched NoC of IC die 102, such that circuit block 116 serves as an endpoint of the packet-switched NoC, according to an embodiment. IC device 100 may include one or more additional inter-die busses, such as an inter-die bus 810 that provides a dedicated, asynchronous communication path between circuit block 118 of IC die 104 and the packet-switched NoC of IC die 102.

In the example of FIG. 8, inter-die bus 802 includes links 804 (e.g., metal-filled vias) that extend between IC die 102 and IC die 104. Inter-die bus 802 further includes interface circuitry 806 that interfaces between links 804 and an NPS 120-16 of NoC circuitry 106. Inter-die bus 802 further includes interface circuitry 808 that interfaces between links 804 and circuit block 116. Inter-die bus 802 is described further below with reference to FIG. 9A.

Further in the example of FIG. 8, inter-die bus 810 includes links 824 (e.g., metal-filled vias) that extend between IC die 102 and IC die 104. Inter-die bus 810 further includes interface circuitry 820 that interfaces between links 824 and an NPS 120-18 of NoC circuitry 106. Inter-die bus 810 further includes interface circuitry 822 that interfaces between links 824 and circuit block 115. Inter-die bus 810 is described further below with reference to FIG. 9B.

FIG. 9A illustrates IC device 100 in which inter-die bus 802 provides a unidirectional, asynchronous path from circuit block 116 to the packet-switched NoC of IC die 102, according to an embodiment. The example of FIG. 9A may represent a situation in which circuit block 116 acts as a master device.

In the example of FIG. 9A, circuit block 116 includes an interface circuit 903 that converts an output of circuit block 116 from a protocol of circuit block 116 to a point-to-point (e.g., AXI) protocol of output 916 that is asynchronous with the NPP of the packet-switched NoC of IC die 102. Interface circuit 903 may include an AXI master interface. (In FIG. 1, FIG. 5, and/or FIG. 8, one or more other circuit blocks of IC device 100 may include an interface circuit similar to interface circuit 903).

Further in the example of FIG. 9A, interface circuitry 808 includes a driver circuit 904 that drives output 902 over links 804. Driver circuit 904 may include a high-impendence current driver circuit.

Further in the example of FIG. 9A, interface circuitry 806 includes a driver circuit 906 that boosts signals received over links 804. Driver circuit 906 may include a high-impendence current driver circuit. Driver circuit 906 may be omitted in some embodiments. Interface circuitry 806 further includes slave interface circuitry 908 that packetizes the output of driver circuit 906. Slave interface circuitry 908 may include an NSU that includes an AXI slave interface, such as described further above with respect to NSU 300 in FIG. 3.

FIG. 9B illustrates IC device 100 in which inter-die bus 810 provides a unidirectional, asynchronous path from the packet-switched NoC of IC die 102 to circuit block 118 of IC die 104, according to an embodiment. The example of FIG. 9B may represent a situation in which circuit block 118 acts as a slave device.

In the example of FIG. 9B, interface circuitry 820 includes master interface circuitry 910 that de-packetizes packets received from NPS 120-18 (e.g., to a point-to-point protocol). Master interface circuitry 910 may include a NMU that includes an AXI master interface, such as described further above with respect to NMU 200 in FIG. 2. Interface circuitry 820 further includes a driver circuit 912 that drives an output of master interface circuitry 910 over links 824. Driver circuit 912 may include a high-impendence current driver circuit.

Further in the example of FIG. 9B, interface circuitry 822 includes a driver circuit 914 that boosts signals received over links 824. Driver circuit 914 may include a high-impendence current driver circuit. Driver circuit 914 may be omitted in some embodiments.

Further in the example of FIG. 9B, circuit block 118 includes an interface circuit 915 that converts an output 916 of driver circuit 914 from the point-to-point protocol to a protocol of circuit block 118. Interface circuit 903 may include an AXI master interface.

In FIG. 1, IC device 100 may include a combination of inter-die busses disclosed herein.

Figure 10:
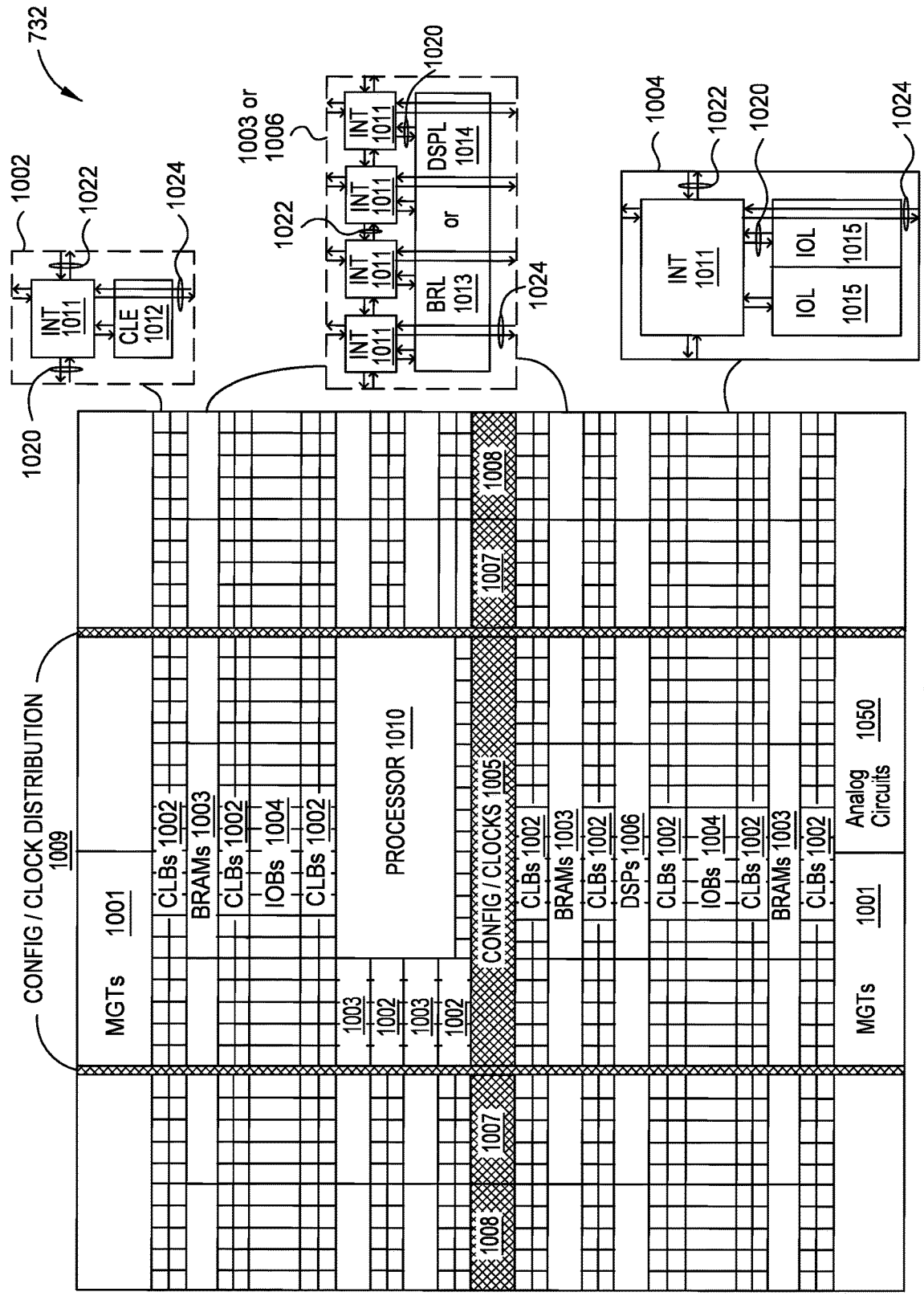
FIG. 10 is a block diagram of programmable logic, or configurable circuitry, including an array of configurable or programmable circuit blocks or tiles, according to an embodiment.

IC die 102 and/or IC die 104, or a portion thereof, may include one or more of a variety of types of configurable circuit blocks, such as described below with reference to FIG. 10. FIG. 10 is a block diagram of configurable circuitry 1000, including an array of configurable or programmable circuit blocks or tiles, according to an embodiment. The example of FIG. 10 may represent a field programmable gate array (FPGA) and/or other IC device(s) that utilizes configurable interconnect structures for selectively coupling circuitry/logic elements, such as complex programmable logic devices (CPLDs).

In the example of FIG. 10, the tiles include multi-gigabit transceivers (MGTs) 1001, configurable logic blocks (CLBs) 1002, block random access memory (BRAM) 1003, input/output blocks (IOBs) 1004, configuration and clocking logic (Config/Clocks) 1005, digital signal processing (DSP) blocks 1006, specialized input/output blocks (I/O) 1007 (e.g., configuration ports and clock ports), and other programmable logic 1008, which may include, without limitation, digital clock managers, analog-to-digital converters, and/or system monitoring logic. The tiles further includes a dedicated processor 1010.

One or more tiles may include a programmable interconnect element (INT) 1011 having connections to input and output terminals 1020 of a programmable logic element within the same tile and/or to one or more other tiles. A programmable INT 1011 may include connections to interconnect segments 1022 of another programmable INT 1011 in the same tile and/or another tile(s). A programmable INT 1011 may include connections to interconnect segments 1024 of general routing resources between logic blocks (not shown). The general routing resources may include routing channels between logic blocks (not shown) including tracks of interconnect segments (e.g., interconnect segments 1024) and switch blocks (not shown) for connecting interconnect segments. Interconnect segments of general routing resources (e.g., interconnect segments 1024) may span one or more logic blocks. Programmable INTs 1011, in combination with general routing resources, may represent a programmable interconnect structure.

A CLB 1002 may include a configurable logic element (CLE) 1012 that can be programmed to implement user logic. A CLB 1002 may also include a programmable INT 1011.

A BRAM 1003 may include a BRAM logic element (BRL) 1013 and one or more programmable INTs 1011. A number of interconnect elements included in a tile may depends on a height of the tile. A BRAM 1003 may, for example, have a height of five CLBs 1002. Other numbers (e.g., four) may also be used.

A DSP block 1006 may include a DSP logic element (DSPL) 1014 in addition to one or more programmable INTs 1011. An IOB 1004 may include, for example, two instances of an input/output logic element (IOL) 1015 in addition to one or more instances of a programmable INT 1011. An I/O pad connected to, for example, an I/O logic element 1015, is not necessarily confined to an area of the I/O logic element 1015.

In the example of FIG. 10, config/clocks 1005 may be used for configuration, clock, and/or other control logic. Vertical columns 1009 may be used to distribute clocks and/or configuration signals.

A logic block (e.g., programmable of fixed-function) may disrupt a columnar structure of configurable circuitry 1000. For example, processor 1010 spans several columns of CLBs 1002 and BRAMs 1003. Processor 1010 may include one or more of a variety of components such as, without limitation, a single microprocessor to a complete programmable processing system of microprocessor(s), memory controllers, and/or peripherals.

In FIG. 10, configurable circuitry 1000 further includes analog circuits 1050, which may include, without limitation, one or more analog switches 107, multiplexers, and/or de-multiplexers. Analog switches 107 may be useful to reduce leakage current.

FIG. 10 is provided for illustrative purposes. Configurable circuitry 1000 is not limited to numbers of logic blocks in a row, relative widths of the rows, numbers and orderings of rows, types of logic blocks included in the rows, relative sizes of the logic blocks, illustrated interconnect/logic implementations, or other example features of FIG. 10.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit (IC) device, comprising:
   first and second IC dies, wherein the first IC die comprises a first network-on-chip (NoC) that comprises a first NoC packet switch (NPS); and
   an inter-die bus coupled to the first and second IC dies;
   wherein the inter-die bus comprises:
      a first interface circuit configured to receive packetized communications from the first NPS, and to de-packetize the packetized communications based on a point-to-point protocol; and
      a first driver circuit configured to receive the de-packetized communications from the first interface circuit and to drive the de-packetized communications to the second IC die over inter-die links of the inter-die bus based on the point-to-point protocol; and
   wherein the second IC die comprises one or more of:
      a second NoC that comprises a second NPS configured to receive the de-packetized communications from the inter-die bus and packetize the de-packetized communications for the second NoC; and
      a functional circuit block and a second interface circuit configured to receive the de-packetized communications from the inter-die bus and to convert the de-packetized communications from the point-to-point protocol to a protocol of the functional circuit block.

2. The IC device of claim 1, wherein the first driver circuit is further configured to drive the de-packetized communications over the inter-die links synchronous with the first NoC.

3. The IC device of claim 1, wherein the first driver circuit is further configured to drive the de-packetized communications over the inter-die links asynchronous with the first NoC based on the point-to-point protocol.

4. The IC device of claim 1, wherein the inter-die bus further comprises:
   a write address channel;
   a write data channel;
   a write response channel;
   a read address channel; and
   a read data channel.

5. The IC device of claim 1, wherein the second IC die comprises:
   the second NoC that comprises the second NPS configured to receive the de-packetized communications from the inter-die bus and packetize the de-packetized communications for the second NoC.

6. The IC device of claim 1, wherein the second IC die comprises:
   the functional circuit block; and
   the second interface circuit configured to receive the de-packetized communications from the inter-die bus and to convert the de-packetized communications from the point-to-point protocol to the protocol of the functional circuit block.

7. The IC device of claim 1, further comprising one or more additional inter-die buses configured to interface between the first NoC and the second IC die.

8. The IC device of claim 1, wherein the second interface circuit further comprises a second driver circuit configured boost the de-packetized communications received from the inter-die bus.

9. The IC device of claim 1, wherein:
the first IC die further comprises a first interface circuit of the inter-die bus and a NoC packet switch (NPS);
the second IC die further comprises a circuit block configured to output a request based on a point-to-point protocol, and a second interface circuit of the inter-die bus, wherein the second interface circuit comprises the first driver circuit, and wherein the first driver circuit is further configured to drive the request over the inter-die links asynchronous with the NoC; and
the first interface circuit comprises a NoC slave unit (NSU) configured to receive the request over the inter-die links, packetize the request, and forward the packetized request to the NPS.

10. An integrated circuit (IC) device, comprising:
first and second IC dies, wherein the first IC die comprises a network-on-chip (NoC); and
an inter-die bus configured to interface between the NoC and the second IC die, wherein the inter-die bus comprises a first driver circuit coupled to inter-die links of the inter-die bus:
wherein:
the first IC die further comprises a first interface circuit of the inter-die bus configured to receive a packetized request from a NoC packet switch (NPS) of the NoC;
the first interface circuit comprises a NoC master unit (NMU) configured to de-packetize the request based on a point-to-point protocol;
the first interface circuit further comprises the first driver circuit configured to drive the de-packetized request over the inter-die links; and
the second IC die further comprises a second interface circuit of the inter-die bus, wherein the second interface is configured to provide the de-packetized request to a circuit block of the second IC die.

11. The IC device of claim 10, wherein:
the second IC die further comprises a second driver circuit configured to boost the de-packetized request.

12. An integrated circuit (IC) device, comprising:
first and second vertically-stacked IC dies, wherein the first IC die comprises a first portion of a packet-switched network-on-chip (NoC), including a first NoC packet switch (NPS), and wherein the second die comprises a second portion of the NoC, including a second NPS; and
an inter-die bus comprising inter-die links coupled to the first and second IC dies, wherein the inter-die bus is configured to de-packetize data from packets received from the first NPS, transmit the de-packetized data from the first IC die to the second IC die via the inter-die links based on a point-to-point protocol, packetize the data at the second IC die, and provide the packetized data to the second NPS, and wherein the inter-die bus further comprises a driver circuit coupled to the inter-die links.

13. The IC device of claim 12, wherein the first and second IC dies further comprise respective first and second interface circuits of the inter-die bus, and wherein the first and second interface circuits are configured to communicate over the inter-die links based on the point-to-point protocol.

14. The IC device of claim 5, wherein:
the first NPS comprises a NoC master unit (NMU) configured to de-packetize the communications from the first interface circuit; and
the second NPS comprises a NoC slave unit (NSU) configured to packetize the de-packetized communications for the second NoC.

15. The IC device of claim 6, wherein:
the first NPS comprises a NoC master unit (NMU) configured to de-packetized communications from the first interface circuit.

16. The IC device of claim 6, wherein the inter-die bus is dedicated to communications between the first IC die and the functional circuit block of the second IC die.

17. The IC device of claim 16, further comprising an additional inter-die bus configured to interface between the NoC and another functional circuit block of the second IC die.

18. The IC device of claim 12, wherein the inter-die bus is further configured to transmit the de-packetized data from the first IC die to the second asynchronous with the NoC.

19. The IC device of claim 12, wherein the inter-die bus is further configured to transmit the de-packetized data from the first IC die to the second synchronous with the NoC.

* * * * *